United States Patent [19]

Watabe

[11] Patent Number: 4,509,586
[45] Date of Patent: Apr. 9, 1985

[54] TEMPERATURE CONTROL DEVICE FOR A REFRIGERATING APPARATUS HAVING BOTH A HEATING MEANS AND A COOLING MEANS

[75] Inventor: Shin Watabe, Nagoya, Japan

[73] Assignee: Mitsubishi Jukogyo Kabushiki Kaisha, Tokyo, Japan

[21] Appl. No.: 492,171

[22] Filed: May 6, 1983

[30] Foreign Application Priority Data

May 20, 1982 [JP] Japan .................................. 57-84006

[51] Int. Cl.³ ...................... F25B 29/00; F25B 41/00; G05D 23/00
[52] U.S. Cl. ........................................ 165/29; 62/163; 62/211; 62/213; 62/229; 165/64; 165/65; 236/91 F
[58] Field of Search ............... 165/29, 64, 65; 62/213, 62/229, 163, 211; 236/91 F

[56] References Cited

U.S. PATENT DOCUMENTS

| | | | |
|---|---|---|---|
| 3,692,100 | 9/1972 | Gallagher, Jr. | 165/29 |
| 3,745,778 | 7/1973 | Attridge, Jr. | 62/229 |
| 3,973,618 | 8/1976 | Naley et al. | 62/213 |
| 4,003,728 | 1/1977 | Rath | 62/211 |
| 4,021,213 | 5/1977 | Neidhardt et al. | 62/229 |

FOREIGN PATENT DOCUMENTS 503241 12/1975 Australia .
1414417 11/1975 United Kingdom .

Primary Examiner—Douglas Hart
Attorney, Agent, or Firm—Wenderoth, Lind & Ponack

[57] ABSTRACT

A refrigerating apparatus adapted for storage of cold storage goods as well as frozen goods and having both a heater and a cooler is controlled by an improved temperature control device, which includes a detector for detecting a temperature of return air from the interior of a storage area of the refrigerating apparatus and a detector for detecting a temperature of an air output which is blown into the interior of the storage area, and which controls either the higher one of the two detected temperatures or the lower one of the two detected temperatures depending upon a set temperature. In the case of storing cold storage goods, the lower one of the two detected temperatures is controlled so as to be maintained at the set temperature, whereas in the case of storing frozen goods, the higher one of the two detected temperatures is controlled so as to be maintained at the set temperature.

4 Claims, 6 Drawing Figures

TEMPERATURE CONTROL DEVICE FOR A REFRIGERATING APPARATUS HAVING BOTH A HEATING MEANS AND A COOLING MEANS

BACKGROUND OF THE INVENTION

The present invention relates to a temperature control device for a refrigerating apparatus having both a heating means and a cooling means, and more particularly to a temperature control device for the refrigerating apparatus of the above-described type which is adapted for storage of cold storage goods as well as frozen goods.

FIG. 1 shows a prior art refrigerant circuit of a refrigerating apparatus having both a heating means and a cooling means to be used for a container, and one example of a temperature control system therefor. In the case of a cooling operation, a refrigerant gas at a high temperature and at a high pressure compressed by a compressor (1) which operates in response to an instruction from a temperature controller (10), discharges heat in a condenser (2), and after being condensed and liquified, the gas reaches a choke device (3). The refrigerant, after having its pressure reduced in this choke device, enters an evaporator (4), and while taking heat away from the air flowing through the evaporator (4), is evaporated into a gaseous state, and returns to the compressor to complete a refrigerating cycle.

During this cycle, the return air (6) of the refrigerating apparatus is cooled as it passes through the evaporator (4) and converted into a low-temperature air output (7) to be blown out into a storage area. Meanwhile, if the temperature of the return air (6) to the refrigerating apparatus, which is detected by a temperature detector (8), reaches a set temperature, then the temperature controller (10) stops the operation of the compressor (1) so as to interrupt the cooling operation. Subsequently, if the temperature within the storage area is raised as by invasion of heat or the like and hence the temperature of the return air (6) to the refrigerating apparatus becomes higher than another set temperature that is separate from the set temperature upon the stopping of the cooling operation, then the temperature controller (10) again instructs the compressor (1) to operate and so, the cooling operation is recommenced.

In the case of a heating operation, the refrigerating cycle is not actuated, but heating is effected by a heater (11). If a current is passed through the heater (11) in response to an instruction from the temperature controller (10), then the return air (6) to the refrigerating apparatus is heated by the heater (11) and converted into the air output (7) which is at a higher temperature an which is blown out into the storage area. If the temperature of the return air (6) to the refrigerating apparatus, which is detected by the temperature detector (8), reaches a predetermined temperature, then the temperature controller (10) stops the feeding of a current to the heater 11 so as to interrupt the heating operation. Meanwhile, if the temperature within the storage is lowered as by outflow of heat to the exterior and hence the temperature of the return air (6) to the refrigerating apparatus becomes lower than a set temperature by at least a predetermined value, then the temperature controller (10) again instructs the passing of a current through the heater (11), and so, the heating operation is recommenced.

This control method for the above-mentioned type of refrigerating apparatus having both a heating means and a cooling means has the following shortcoming. More particularly, in the case of the cooling operation, a difference between the temperature of the return air to the refrigerating apparatus and the temperature of the air output (7) into the storage area would be inevitably produced to the extent corresponding to a refrigerating capability. Since this refrigerating capability is set at such value that the lack of a refrigerating capability may not occur even in the case where the atmospheric air temperature is high, the return air (6) and the air output (7) always has a temperature difference to a certain extent (normally 2 or more degrees).

Therefore, in the event that goods which are intended to maintain a high quality by monitoring them so as to maintain a storage temperature that is very close to a freezing point such as, for instance, fruits, chilled beef, etc., the set temperature would be set higher than the freezing point by a value corresponding to the temperature difference so that the temperature of the air output (7) may not become lower than the freezing point of the goods. The cycles are repeated such that at the time point when the temperature of the return air (6) has reached this set temperature, the cooling operation is interrupted and at the time point when the return air temperature has risen by a predetermined value (normally, one or more degrees) with respect to the set temperature, the cooling operation is recommended.

Consequently, even when it is desirable to hold a temperature close to the freezing point, as is the case with long term preservation, a temperature difference is inevitably produced to a certain extent. Furthermore, in the case of the heating operation, since the temperature of the air output (7) becomes higher than that of the return air (6), the temperature difference (the difference between the freezing point and the holding temperature) would be further increased.

In order to compensate for this shortcoming, a system shown in FIG. 2 was proposed in the prior art. According to the system shown in FIG. 2, in the case where it is desired to preserve goods without causing their freezing and yet keep them at a temperature close to the freezing point of the goods, as is the case with cold storage goods, then temperature control is effected in response to a temperature detector (9) provided in the air output (7) blown into the storage area, whereas in the case of preserving goods which necessitate a sufficiently low temperature as is the case with frozen foods or the like, then temperature control is effected by employing the temperature detector (8) provided in the return air (6) to the refrigerating apparatus. It is to be noted that the temperature control by employing the temperature detector (8) is the same as that described in connection to the system shown in FIG. 1. The temperature control by making use of the temperature detector (9) is effected in the following manner.

In the case of the cooling operation, the refrigerating cycle when the temperature of the air output (7) blown into the storage area is sufficiently high with respect to a set temperature becomes identical to that described above with reference to FIG. 1. As the temperature within the storage area is lowered and the temperature of the air output (7) blown into the storage area approaches the set temperature, the temperature controller (10) issues an instruction that an opening angle of a valve (5) should be increased. As a result, a part of the refrigerant gas at a high temperature and at a high pressure leaving the compressor (1) would enter the evaporator (4) without discharging heat, so that the quantity of heat taken away from the ambient air by the refrigerant is reduced. In other words, the refrigerating capability is lowered.

As the temperature of the air output (7) further approaches the set temperature, the temperature controller (10) issues an instruction that the opening angle of the valve (5) should be further increased. As a result, the temperature of the air output (7) can coincide with the set temperature under a stable condition, and at this moment, the refrigerating capability coincides with the refrigerating load. At this time, the temperature of the return air (6) becomes higher than that of the air output (7) by a value equal to the refrigerating load divided by a heat capacity of the circulating air. In this way, it becomes possible to place a set temperature very close to a freezing point of the goods in the case of the cooling operation by controlling the temperature of the air output (7) that is at a lower temperature.

However, in the case of the heating operation, the situation becomes different from the above-described one. At this time, the operation of the refrigerating cycle is not always necessary, and the following description will be made with respect to the case where the circulating air is heated by a heater (11). When a current is passed through the heater (11) in response to an instruction from the temperature controller (10), the return air (6) to the refrigerating apparatus is heated by the heater (11) and converted into an air output (7) at a higher temperature which is blown out into the storage area.

If the temperature of the air output (7) detected by the temperature detector (9) reaches a predetermined temperature, then the temperature controller 10 stops feeding a current to the heater (11) and the heating operation is thereby interrupted. When the temperature within the storage area has lowered due to outflow of heat to the exterior and the temperature of the air output (7) has become lower than the set temperature by at least a predetermined value, the temperature controller (10) again instructs the passing of a current through the heater (11) to recommence the heating operation.

In the above-mentioned case, since the temperature of the return air (6) becomes lower than the temperature of the air output (7), when the set temperature is placed close to the freezing point of the goods, the temperature of the return air (6) would become lower than the freezing point, resulting in the freezing of the goods. Consequently, in the case of the system shown in FIG. 2, there is also a shortcoming in that the set temperature cannot be preset in the proximity of the freezing point of the goods.

SUMMARY OF THE INVENTION

It is therefore one object of the present invention to provide a temperature control device for a refrigerating apparatus having both a heating means and a cooling means, and which is adapted for storage of cold storage goods as well as frozen goods.

Another object of the present invention is to provide a temperature control device for a refrigerating apparatus having both a heating means and a cooling means, in which a set temperature can be preset in the proximity of a freezing point of goods to be stored in the case of storing cold storage goods.

According to one feature of the present invention, there is provided a temperature control device for a refrigerating apparatus having both a heating means and a cooling means, and comprising a means for detecting a temperature of return air from an interior of a storage area of the refrigerating apparatus, a means for detecting a temperature of air output which is blown into the interior of the storage area and a means for controlling either the higher one of said two temperatures or the lower one of said two temperatures, depending upon a set temperature.

BRIEF DESCRIPTION OF THE DRAWINGS

The above-mentioned and other features and objects of the present invention will become more apparent by reference to the following description of a preferred embodiment of the invention taken in conjunction with the accompanying drawings, wherein.

DESCRIPTION OF THE PREFERRED EMBODIMENT

Figure 1:
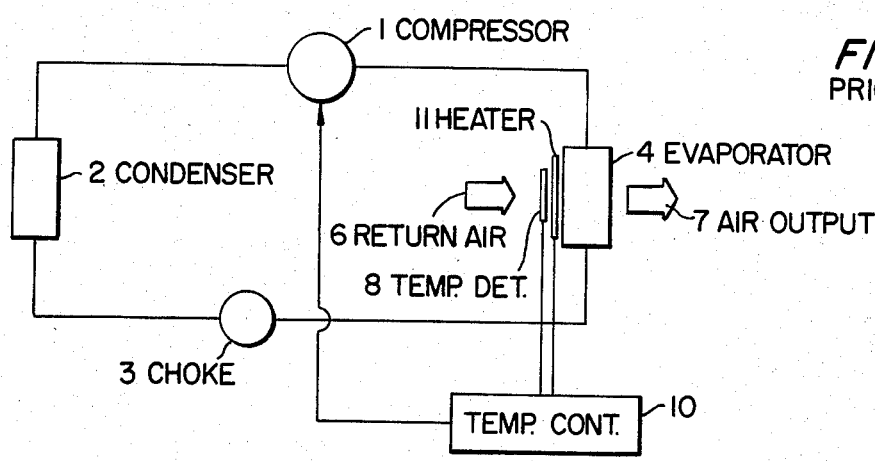
FIGS. 1 and 2, respectively, are circuit diagrams of temperature control devices for refrigerating apparatuses in the prior art.
Figure 2:
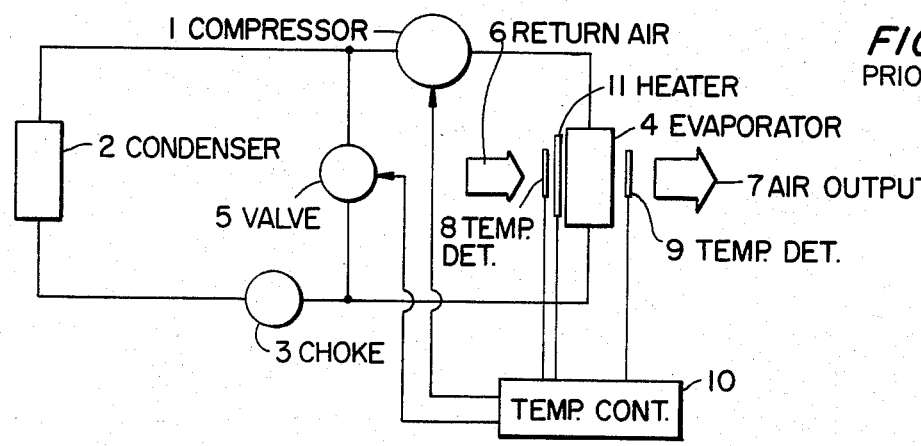
Figure 3:
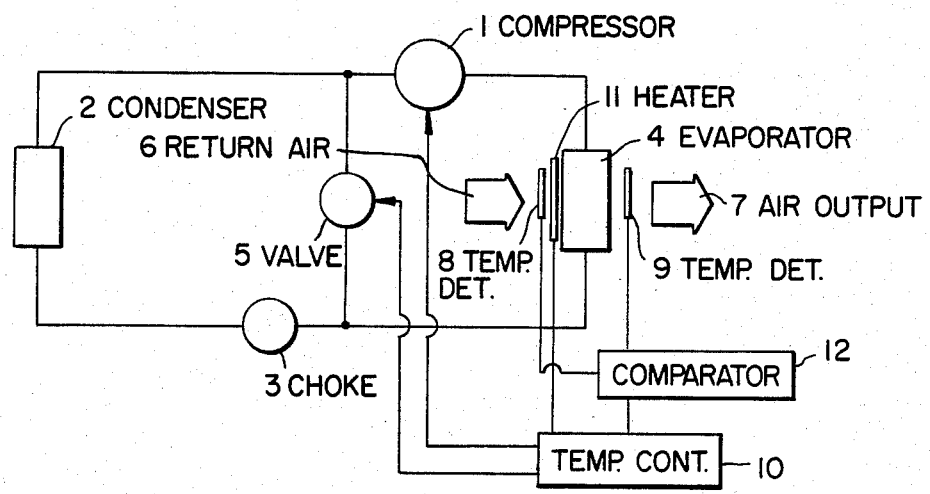
FIG. 3 is a circuit diagram of a temperature control device for a refrigerating apparatus having both a heating means and a cooling means according to one preferred embodiment of the present invention.

Now one preferred embodiment of the present invention will be described in detail with reference to FIG. 3 which shows a temperature control device for a refrigerating apparatus having both a heating means and a cooling means. In this embodiment, component parts which are in themselves not essentially related to the present invention such as, for example, a dryer and the like in a refrigerant circuit and a power supply and the like in the control circuit are omitted from the description and illustration. In addition, component parts which are equivalent to those illustrated in FIGS. 1 and 2 are denoted by like reference numerals. In FIG. 3, reference numeral (1) designates a compressor, numeral (2) designates a condenser, numeral (3) designates a choke device, numeral (4) designates an evaporator, numeral (5) designates a valve, numeral (6) designates return air to the refrigerating apparatus, numeral (7) designates air output which is blown into the interior of a storage area, numeral (8) designates a temperature detector, numeral (9) designates another temperature detector, numeral (10) designates a temperature controller, numeral (11) designates a heater, and these component parts are similar to those shown in FIGS. 1 and 2. In addition, reference numeral (12) designates a comparator.

In the event that it is desired to preserve goods at a temperature in the proximity of their freezing point without causing freezing of the goods as in the case with cold storage goods, the refrigerating apparatus is controlled so that between the temperatures indicated by the two temperature detectors (8) and (9), the lower temperature may be brought to the set temperature, whereas in the case of storage of foods which necessitate a sufficiently low temperature as is the case with frozen foods, the refrigerating apparatus is controlled so that among the temperatures indicated by the two temperature detectors (8) and (9), the higher temperature may be brought to the set temperature.

In the case of a cooling operation, as a matter of course, the temperature of the air output (7) which is blown into the storage area becomes lower than the temperature of the return air (6) to the refrigerating apparatus. Accordingly, upon storage of cold storage goods, the temperature indicated by the temperature detector (9) provided in the air output (7) which is blown into the storage area is selected by the comparator (12), and the refrigerating apparatus is controlled so that this selected temperature may be brought to the set temperature. Upon the storage of frozen goods, the temperature indicated by the temperature detector (8) provided in the return air (6) to the refrigerating apparatus is selected by the comparator (12), and the refrigerating apparatus is controlled so that this selected temperature may be brought to the set temperature.

In the case of a heating operation, the temperature of the return air (6) to the refrigerating apparatus becomes lower than the temperature of the air output (7) which is blown into the storage area. Accordingly, upon the storage of cold storage goods, the temperature indicated by the temperature detector (8) provided in the return air (6) to the refrigerating apparatus is selected by the comparator (12), and the refrigerating apparatus is controlled so that this selected temperature may be brought to the set temperature.

The control in the case where the refrigerating cycle is not actuated is effected in the following manner. If a current is passed through the heater (11) in response to an instruction from the temperature controller (10), the return air (6) to the refrigerating apparatus is heated by the heater (11) and converted into the air output (7) which is at a higher temperature and which is blown out into the storage area. In this case, as described previously, the temperatures detected by the temperature detectors (8) and (9), respectively, are compared by the comparator (12). In this instance, the temperature detected by the temperature detector (8) provided in the return air (6) is selected, and when this selected temperature has risen up to the set temperature, the temperature controller (10) stops the feeding of a current to the heater (11).

In other words, the heating operation is interrupted. If the temperature within the storage is lowered due to outflow of heat to the exterior and the temperature of the return air (6) to the refrigerating apparatus is lowered to a preset value, the temperature controller (10) again instructs the passing of a current through the heater (11) to recommence the heating operation.

The control in the case where actuation of the refrigerating cycle occurs is effected in the following manner. The heating operation associated with this actuation of the refrigerating cycle occurs in the case where the heating operation has become necessary due to the lowering of the external air temperature in view of the condition of the cooling operation, and that is the case where a heating capability is almost not necessitated. Here, a description will be made on one example with respect to the case where a current is also passed through the heater (11).

A part of a refrigerant gas at a high temperature and at a high pressure is compressed by the compressor (1) and discharges heat in the condenser (2), and after being condensed and liquified, the gas reaches the choke device (3) in which it is reduced in pressure. The other part of the refrigerant gas at a high temperature and at a high pressure is compressed by the compressor (1) and passes through the valve (5) whose opening angle is regulated by the temperature controller (10), and then is reduced in pressure while being maintained at the high temperature, and enters the evaporator (4) jointly with the refrigerant passed through the choke device (3).

The opening angle of this valve (5) is regulated by the temperature controller (10) so that the difference obtained by subtracting the heat quantity taken away from the air flowing through the evaporator (4) by the refrigerant in the evaporator (4) from the heat quantity applied by the heater (11), may coincide with the heat quantity flowing out to the exterior. The refrigerant which left the evaporator (4) returns to the compressor (1) and thus the refrigerating cycle is completed.

In the case where the external air temperature has varied, for instance, in the case where the external air temperature has risen, since the necessary heating capability is reduced, the temperature controller (10) issues an instruction to reduce the opening angle of the valve (5) so that the refrigerating capability of the refrigerating cycle may be increased. If the external air temperature rises further, hence heating becomes unnecessary and cooling becomes necessary, then the temperature of the air output (7) becomes lower than the temperature of the return air (6), and therefore, the comparator (12) would select the temperature indicated by the temperature detector (9).

On the other hand, in the case where the external air temperature has lowered, since the necessary heating capability is increased, the temperature controller (10) issues an instruction that the opening angle of the valve (5) should be increased, and the system operates such that the thermal load and the heating capability of the refrigerating apparatus coincide with each other.

In the case of storage of frozen goods, generally it is not necessary to preserve goods at a constant temperature even by effecting heating, too. In addition, even in the event that the air temperature has become very low with respect to the set temperature, it would not be harmful for the stored goods. Accordingly, there is no need to pass a current through the heater (11) and the valve (5) also could be held closed. In other words, the heating operation is unnecessary and there is no need to take the heating operation into consideration.

Now, one example of a more detailed structure of the controller (10) and the comparator (12) in FIG. 3 will be described with reference to FIG. 4.

The temperatures detected by the temperature detectors (8) and (9), respectively, in FIG. 3 are transmitted to the comparator (12), and in this comparator, the temperatures detected by these temperature detectors (8) and (9) are respectively input to both a lower temperature selector (25) and a higher temperature selector (26). The lower temperature selector (25) always selects the lower of the temperatures detected by the temperature detectors (8) and (9), while the higher temperature selector (26) always selects the higher of the two temperatures. A desired temperature to be maintained in the interior of the storage is preset in a temperature set device (21) in the controller (10), and the set temperature in the temperature set device (21), the temperature selected by the temperature selector (25) and the temperature selected by the temperature selector (26) are supplied to a representative temperature selector (27) in the comparator (12). The representative temperature selector (27) is adapted to select either one of the output temperature signals from the temperature selectors (25)

and (26) depending upon the value of the temperature preset in the temperature set device (21). For instance, in the event that a temperature satisfying a cold storage condition such as, for example, 0° C. is preset in the temperature set device (21), the representative temperature selector (27) would selectively output the result of selection by the lower temperature selector (25) as a representative temperature, whereas in the event that a temperature satisfying a freezer storage condition such as, for example, −18° C. is preset in the temperature set device (21), the representative temperature selector would selectively output the result of selection by the higher temperature selector (26) as a representative temperature. Accordingly, for instance, in the case where the preset temperature is 0° C. and a cooling operation is effected, then the detected temperature of the temperature detector (9) which detects the temperature of the air output (7) is lower than the detected temperature of the temperature detector (8) which detects the temperature of the return air (6), and hence, the lower temperature is selected as a representative temperature, and as a result, the temperature detected by the temperature detector (9) would be selected and output from the representative temperature selector (27) as a representative temperature.

Figure 4:
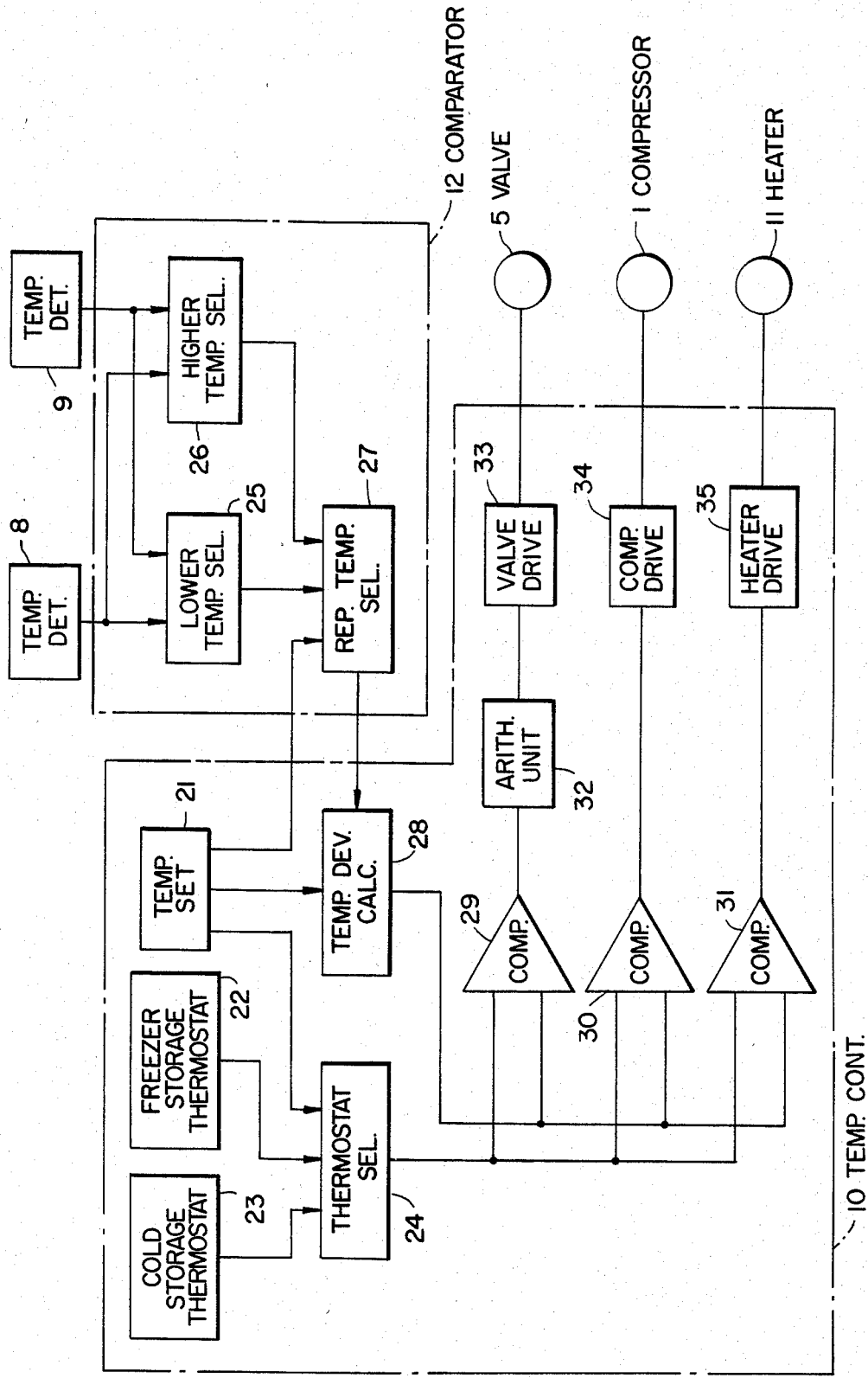
FIG. 4 is a block diagram showing a more detailed structure of a temperature controller (10) and a comparator (12) as shown in FIG. 3.

On the other hand, in the temperature controller (10) as framed by a dash-dot line in FIG. 4, a temperature difference $\epsilon$ between the representative temperature selected by the representative temperature selector (27) in the comparator (10) and a desired temperature preset in a temperature preset device (21) is calculated by a temperature deviation calculator (28), and at the same time, a thermostat selector (24) selects either a cold storage condition thermostat (23) or a freezer storage condition thermostat (22) depending upon the temperature set in the temperature preset device (21) in such manner that if a temperature for a cold storage condition such as, for example, 0° C. is preset in the temperature preset device (21), the cold storage condition thermostat (23) is selected, while if a temperature for a freezer storage condition such as, for example, −18° C. is preset in the temperature preset device (21), the freezer condition thermostat (22) is selected. Here, it is to be noted that each of the thermostats (22) and (23) is adapted to output a signal representing a tolerable temperature deviation $\pm \epsilon_o$ from a set temperature under the corresponding condition (cold storage or freezer storage condition). These output signals as well as a signal representing a preset temperature issued from the temperature preset (21) are supplied to the thermostat selector (24) and a signal representing a tolerable temperature deviation from the set temperature that is issued from the thermostat (23) or the thermostat (22) is output from the thermostat selector (24). The temperature deviation calculated by the temperature deviation calculator (28) is compared with the tolerable temperature deviation set in the thermostat (22) or (23) as selected by the thermostat selector (24), in comparators (29), (30) and (31), respectively. In the event that the absolute value of the calculated temperature deviation $|\epsilon|$ is equal to or smaller than the absolute value of the selected tolerable temperature deviation $|\epsilon_o|$, that is, if $|\epsilon| \leq |\epsilon_o|$, then no output is issued from these comparators (29), (30) and (31), and hence, the valve drive circuit (33), the compressor drive circuit (34) nor the heater drive circuit (35) are not operated. Whereas, in the event that the absolute value of the calculated temperature deviation $|\epsilon|$ exceeds the absolute value of the tolerable temperature deviation $|\epsilon_o|$, that is, if $|\epsilon| > |\epsilon_o|$, then the comparator (29) issues an analog output signal proportional to the calculated temperature deviation $\epsilon$, which is then subjected to calculation in an arithmetic unit (32) to perform a proportional control of the valve (5) in FIG. 3, and the result of calculation is transmitted to the valve drive circuit (33) to instruct that the valve (5) should be maintained at an appropriate opening angle. At the same time, in the event of $|\epsilon| > \epsilon_o|$, the comparators (30) and (31), respectively, issue ON signals for operating the compressor drive circuit (34) and the heater drive circuit (35) and the compressor (1) and the heater (11) are thereby energized.

Figure 5:
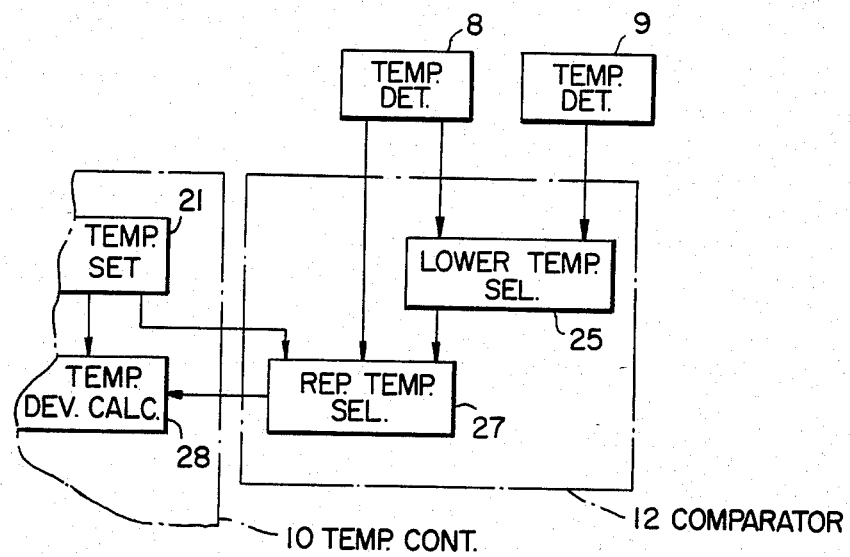
FIGS. 5 and 6, respectively, show the detailed structure of modifications of the comparator (12) shown in FIG. 4.
Figure 6:
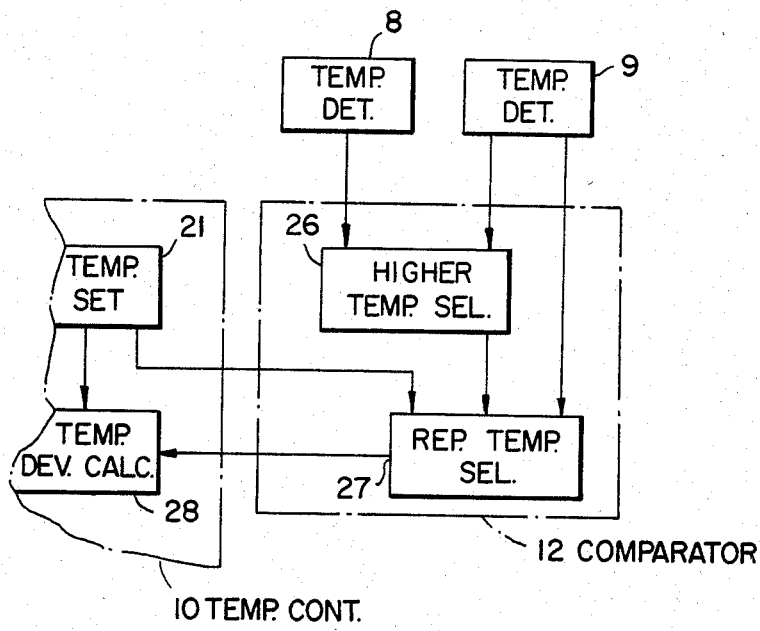

In FIGS. 5 and 6 are illustrated modifications to the circuit construction of the comparator (12) shown in FIG. 4. As will be obvious from the illustrated block diagrams, the comparator (12) in FIG. 5 and the comparator (12) in FIG. 6 operate according to a different logic from that shown in FIG. 4. More particularly, the comparator (12) shown in FIG. 5 operates in such manner that if a temperature for a frozen storage condition is set in the temperature preset device (21), then the temperature detected by the temperature detector (8) provided in the return air (6) is selected as a representative temperature by the representative temperature selector (27) and that temperature is controlled by the temperature controller (10), while if a temperature for a cold storage condition is set in the temperature preset device (21), then a lower temperature of the temperatures detected by the temperature detectors (8) and (9) is selected as a representative temperature by the representative temperature selector (27) and that temperature is controlled by the temperature controller (10). Whereas, the comparator (12) shown in FIG. 6 operates in such manner that if a temperature for a freezer storage condition is set in the temperature preset device (21), then a higher temperature of the temperatures detected by the temperature detectors (8) and (9) is selected as a representative temperature by the representative temperature selector (27) and that temperature is controlled by the temperature controller (10), while if a temperature for a cold storage condition is set in the temperature preset device (21), then the temperature detected by the temperature detector (9) provided in the air output (7) is selected as a representative temperature by the representative temperature selector (27) and that temperature is controlled by the temperature controller (10).

In the above-described embodiment, as a method for reducing a refrigerating capability in the refrigerating cycle, an example relying upon by-passing of a hot gas has been disclosed. However, it is not always necessary for the hot gas by-pass method to be used, but for instance, the rotational speed of the compressor (1) could be varied in response to an instruction issued from the temperature controller (10), or else the method of regulating a circulation rate of the refrigerant by providing a separate valve between the evaporator (4) and the compressor (1) could be employed.

In addition, in the above-described embodiment, as a method for obtaining a refrigerating capability matched with a thermal load, an example in which a refrigerating capability obtained by the refrigerating cycle is controlled has been described. However, the same object can be achieved even by the method of controlling the input to the heater (11). In this case, the refrigerating cycle is only required to have a constant refrigerating capability, and a valve whose opening angle is regulated externally such as the valve (5) is unnecessary.

Since the present invention is constructed as described above, in the case of employing the control device for a refrigerating apparatus according to the present invention, it becomes possible to eliminate the shortcoming in the prior art that in the case of holding constant a temperature of cold storage goods by a heating operation, air having a lower temperature than the air temperature at the portion being controlled would be present. Hence, it becomes possible that the temperature to be controlled upon storage of cold storage goods is preset so as to be closer to the freezing point of the goods, and therefore, the present invention is effective for the preservation of quality of the cold storage goods.

Since many changes and modifications could be made in the above construction and many apparently widely different embodiments of this invention could be made without departing from the scope thereof, it is intended that all matter contained in the above description or shown in the accompanying drawings shall be interpreted as illustrative and not as a limitation to the scope of the invention.

What is claimed is:

1. A temperature control device for a refrigerating apparatus having both a heating means and a cooling means, said device comprising a means for detecting a temperature of return air from an interior of a storage area of said refrigerating apparatus, a means for detecting a temperature of air which is blown into said interior of said storage area, and a means for controlling said heating and cooling means in accordance with the temperature detected by said means for detecting said return air temperature when a set temperature is lower than a predetermined temperature and in accordance with the lower one of the two temperatures detected by said two temperatures detecting means when said set temperature is higher than said predetermined temperature.

2. A temperature control device for a refrigerating apparatus having both a heating means and a cooling means, said device comprising a means for detecting a temperature of return air from an interior of a storage area of said refrigerating apparatus, a means for detecting a temperature of air which is blown into said interior of said storage area, and a means for controlling said heating and cooling means in accordance with the higher one of the two temperatures detected by said two temperature detecting means when a set temperature is lower than a predetermined temperature and in accordance with the temperature detected by said means for detecting a temperature of air which is blown into said interior of said storage area when said set temperature is higher than said predetermined temperature.

3. A temperature control device for a refrigerating apparatus having both a heating means and a cooling means, said device comprising a means for detecting a temperature of return air from an interior of a storage area of said refrigerating apparatus and a means for detecting a temperature of air which is blown into said interior of said storage area, and a means for controlling said apparatus in dependence upon either the higher one of said two detected temperatures or the lower one of said two detected temperatures, depending upon a set temperature; wherein, when said set temperature is lower than a predetermined value, said temperature control device controls said apparatus in accordance with the higher of said two detected temperatures, and wherein, when said set temperature is higher than said predetermined value, said temperature control device controls said apparatus in accordance with the lower one of said two detected temperatures.

4. A temperature control device for a refrigerating apparatus having both a heating means and a cooling means, said device comprising a means for detecting a temperature of return air from an interior of a storage area of said refrigerating apparatus and a means for detecting a temperature of air which is blow into said interior of said storage area, and a means for controlling said apparatus in dependance upon either the higher one of said two detected temperatures or the lower one of said two detected temperatures, depending upon a set temperature, said device further comprising a means for comparing the temperatures detected by said two temperature detecting means; wherein, when said set temperature is lower than a predetermined value, the higher one of said two detected temperatures is selected by said comparing means to be used by said controlling means for controlling said apparatus, and wherein, when said set temperature is higher than a predetermined value, the lower one of the two detected temperatures is selected by said comparing means to be used by said controlling means for controlling said apparatus.

* * * * *